United States Patent [19]
Yang

[11] Patent Number: 5,751,087
[45] Date of Patent: May 12, 1998

[54] ARMATURE WINDING OFFSET ANGLE EXCITED AND SPEED CONTROLLED RECTIFIER TYPE ELECTRIC MACHINE

[76] Inventor: Tai-Her Yang, No.32 Lane 29, Taipin St., Si-Hu Town, Dzan-Hwa, Taiwan

[21] Appl. No.: 726,406

[22] Filed: Oct. 3, 1996

Related U.S. Application Data

[63] Continuation of Ser. No. 291,681, Aug. 16, 1994, abandoned.

[51] Int. Cl.[6] .................................................. H02K 1/12
[52] U.S. Cl. ........................... 310/179; 310/186; 310/193
[58] Field of Search ............................... 310/179, 229, 310/244, 241, 234, 68 A, 190, 191, 186, 192, 193

[56] References Cited

U.S. PATENT DOCUMENTS

| | | | |
|---|---|---|---|
| 3,761,851 | 9/1973 | Nelson | 335/253 |
| 4,507,565 | 3/1985 | Hamano | 290/38 R |
| 4,536,669 | 8/1985 | Morishita | 310/241 |
| 5,089,737 | 2/1992 | Abukawa et al. | 310/154 |

FOREIGN PATENT DOCUMENTS

| 913924 | 7/1949 | Germany | 310/166 |
|---|---|---|---|

OTHER PUBLICATIONS

English Translation of German Patent No. 913,924, Oct. 1953.

Primary Examiner—Steven L. Stephan
Assistant Examiner—Judson H. Jones
Attorney, Agent, or Firm—Bacon & Thomas

[57] ABSTRACT

An electric machine uses materials with hysteresis characteristics (such as cast steel) to form the field poles and magnetic flux to align with the magnetic flux in the armature excited by the inclined angle of the brushes for use as a one directional rotational electric motor, or for a generator power output if there is a mechanical work input. By utilizing the armature winding offset angle for excitation and control to eliminate the field exciting components, the machine is an improved design that has a simple structure and low cost.

2 Claims, 2 Drawing Sheets

ARMATURE WINDING OFFSET ANGLE EXCITED AND SPEED CONTROLLED RECTIFIER TYPE ELECTRIC MACHINE

This application is a continuation of application Ser. No. 08/291,681 filed Aug. 16, 1994 now abandoned.

SUMMARY OF INVENTION

The present invention discloses a design with only installing the armature winding and eliminating the field winding, whereby the armature winding flux axis and the field flux axis form a particular angle to result in the following functions:

1. The armature winding axis and field winding flux axis are in 90° displacement, thereby the armature has no torque output, and is usually set at power "OFF" state.

2. The armature winding flux axis and the field flux axis are in 90° displacement and the brushes are set from the neutral position in 90° electrical angle displacement with the field flux axis to incline clockwise to the 90°–180° electrical angle position so as to let the armature provide various speed output clockwise according to the said angle difference.

3. The armature winding flux axis and the field flux axis are in 90° displacement and the brushes set from the neutral position in 90° electrical angle displacement with the field flux axis to incline counter clockwise to the 0°–90° electrical angle position so as to let the armature provide various speed outputs counter clockwise to the said angle difference.

4. The said electric machine, by utilizing materials with hysteresis characteristics (such as cast steel, etc.) establishes the magnetic field to align with the flux excited by the brushes inclined angle at the armature and become a one directional rotating machine, or to have the mechanical energy input for converting the electric machine into a generator for power output. The generator's output characteristics are similar to a series excited generator which is characterized in that the magnetic flux excited by the armature current due to the angle displacement is aligned with the hysteresis flux.

DETAILED DESCRIPTION OF THE INVENTION

When the electric machine is used for mechanical work output, the field excitation is from the armature winding, therein the inclined electrical angle between the axis of the brushes and the field flux axis causes partial armature current to excite the field poles at the same axis as the field flux axis, therefore the armature rotation is not related to the input current characteristics, and the said electric machine can be used as an AC or DC motor. The electric machine has a small size from the elimination of the field winding and is particularly suitable for space limited servo driving applications.

The above described method to obtain the armature winding offset angle excited and speed controlled rectifier type electric machine by setting the electrical angle difference between the axis of the brushes and the axis of the field flux can be furthered by changing the electrical angle between each of the commutator foil on the armature and its corresponding connected armature winding distribution in the slots, thereby to have the electrical angles between the flux axis of the armature winding distribution in the respective slots and the field flux axis larger or smaller than 90 angle differences, so as to obtain the same effect by changing the angle of the axis of the brushes.

Figure 1:
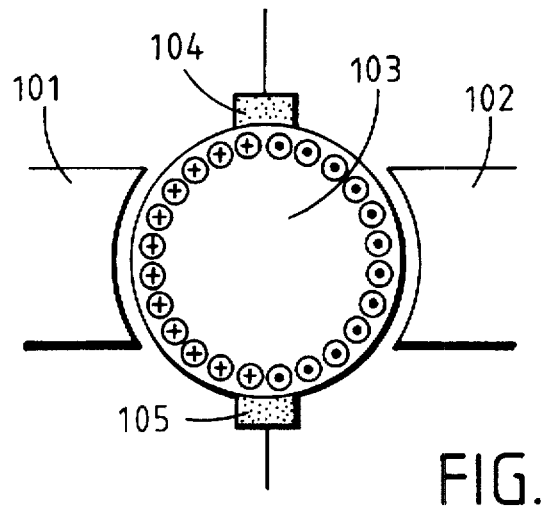
FIG. 1 shows the principle structure of the armature winding offset angle excited and speed controlled rectified electrical machine.

FIG. 1 shows the principle structure of the armature winding offset angle excited and speed controlled rectified electrical machine which is mainly comprised of the following:

A magnetic field which is comprised of at least one pair of magnetic poles 101, 102 coupled at the armature surface, wherein an adequate clearance and a closed magnetic field is maintained;

The armature 103 is comprised of commutator, armature winding, insulation material, rotation support mechanism (such as bearings) and at least one pair of brushes 104, 105 and brush base;

One Housing and related mechanism.

It is mainly characterized in:

The magnetic field does not employ a field winding or other excited components such as permanent magnet, etc. but utilizes a magnetic inductive material to constitute the magnetic poles and connect the magnetic flux between the poles and the armature to thereby form a closed flux;

The armature winding through the armature current generates a excited flux axis which along with the field flux axis forms a fixed or adjustable angle. The angles and their relative functions include:

1) The armature winding axis and the field flux axis are in 90° displacement, thereby the armature has no torque output, and is usually set at power "OFF" state.

Figure 2:
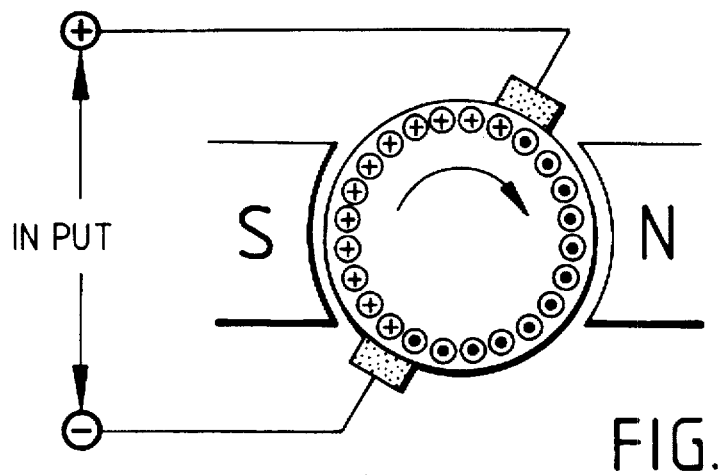
FIG. 2 is an embodying diagram showing the armature winding offset angle excited and speed controlled rectifier type electric machine with the brushes inclined between 90°–180°.
Figure 3:
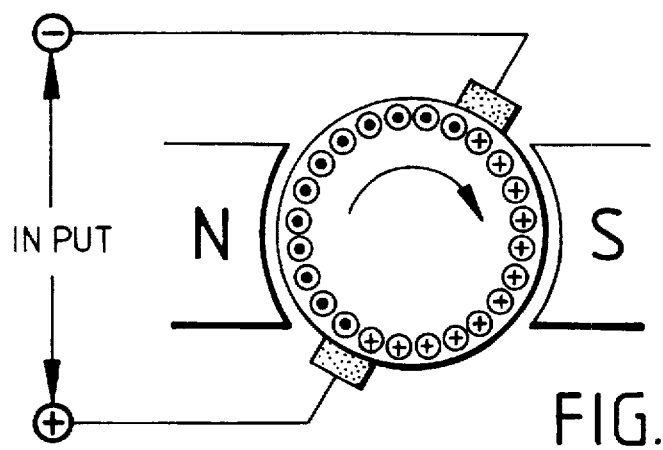
FIG. 3 is an embodying example of reverse current output.
Figure 4:
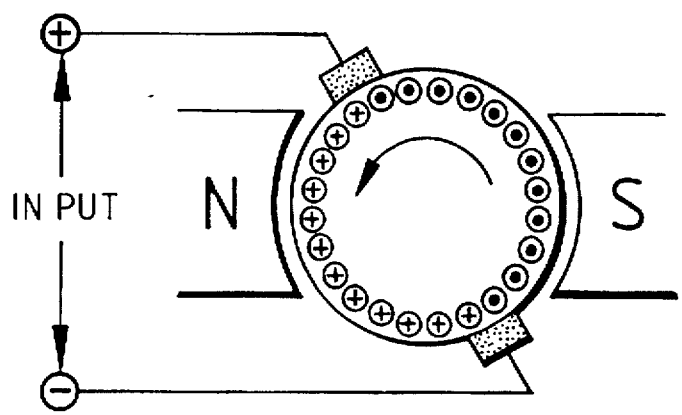
FIG. 4 is an embodying diagram showing the armature winding offset angle excited and speed controlled rectifier type electric machine with the brushes inclined between 0°–90°.

2) The armature winding flux axis and the field flux axis is in 90° displacement and the brushes are set from the neutral position where it is in 90° electrical angle displacement with the field flux axis to incline clockwise to the 90°–180° electrical angle position such that the armature provides various speed output clockwise according to the said angle difference. FIG. 2 is an embodying diagram showing the armature winding offset angle excited and speed controlled rectifier type electric machine with the brushes inclined between 90°–180°. FIG. 3 is an embodying example of reverse current output of FIG. 2. 3) The armature winding flux axis and the field flux axis are in 90° displacement and the brushes are set from the neutral position where it is in 90° electrical angle displacement with the field flux axis to incline counter clockwise to the 0°–90° electrical angle position so as to let the armature provide various speed output counter clockwise to the said angle difference. FIG. 4 is an embodying diagram showing the armature winding offset angle excited and speed controlled rectifier type electric machine with the brushes inclined between 0°–90°.

Figure 5:
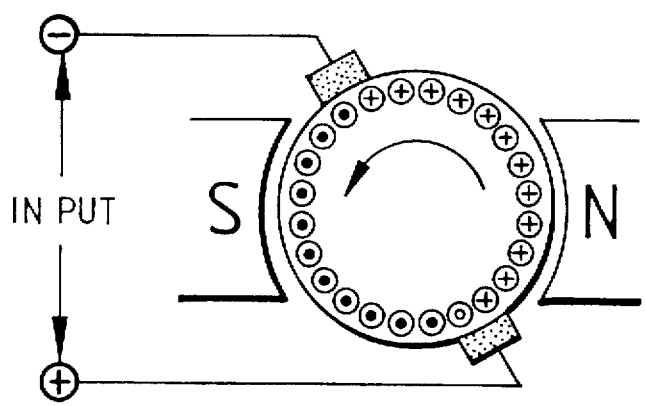
FIG. 5 is an embodying example of reverse current output of FIG. 4.

FIG. 5 is an embodying example of reverse current output of FIG. 4.

In practical applications, the following auxiliary controls are usually adopted:

At the nearby region where the flux axis of the armature winding and the field flux axis are in 90° electrical angle displacement, the circuit is usually set at power "OFF" state to avoid the impact from the instant high speed reverse rotation.

At the nearby region where the flux axis of the armature winding and the field flux axis are 0° or 180° electrical angle displacement, the electric machine current capacity is controlled to avoid too large a current.

The improved design relates to adjusting the angle between the brushes and the field flux axis to establish an offset angle between the armature winding and the field flux axis to provide the field excitation through the armature winding offset angle. The said machine is further characterized by manually or mechanically adjusting the brush electrical angle shifting mechanism, or by a preset electrical angle inclination between the brushes and the field flux axis, to control the field excitation intensity through changing the brush inclination angle and to be further used for armature speed control in the case of an electric motor or for the output voltage control in the case of a generator.

The improved design is chiefly characterized in that the field excitation is obtained by the armature winding offset angle and is without a field winding or permanent magnet. In the actual embodiments, the above explained principle can be applied to incorporate with the mechanism of the electric machine to make the inner or external rotors in different structures on the same principle such as cylindrical rotors, wedge rotors, cup shaped rotors, disk shaped rotors, linear rotor, etc. The various geometric styles according to the space requirement can be selected to increase the flexibilities in applications on the condition that the field poles, the magnetic flux passages and the armature constitute a closed magnetic circuit.

Figure 6:
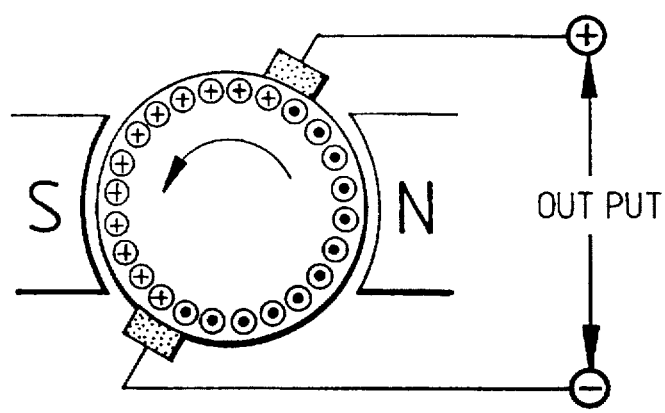
FIG. 6 is an example of the armature winding offset angle excited and speed controlled electric machine used as a DC generator.

The said electric machine uses materials with hysteresis characteristics (such as cast steel) to form the field poles and magnetic flux to align with the magnetic flux in the armature excited by the brushes inclined angle for use as a one directional rotational electric motor, or the said machine can be used for a generator power output if there is a mechanical work input. FIG. 6 illustrates an example of the armature winding offset angle excited and speed controlled rectifier type electric machine used as a DC generator with the output characteristics similar to a series excited generator and is characterized in that the armature current excited flux from the electrical angle difference is aligned with the magnetic hysteresis flux.

As concluded in the foregoing descriptions, by utilizing the armature winding offset angle for excitation and control to eliminate the field exciting components, the said machine is an improved design that gives the features of simple structure and low cost and thereby is valuable to the applications concerning the cost and space.

What is claimed is:

1. An armature winding offset angle excited and speed controlled rectifier type of electric motor comprising:

a) a rotatable armature having an armature winding, an armature winding axis and a commutator;

b) non-permanent magnet field poles located adjacent to the rotatable armature on diametrically opposite sides thereof, the field poles being comprised of a magnetic inductive material having hysteresis characteristics without a field winding, wherein a field flux axis is displaced substantially 90° from the armature winding axis such that the armature has no torque output;

c) at least one pair of brushes in electrical communication with the commutator wherein the at least one pair of brushes are movable in a circumferential direction relative to the armature from a neutral position located at 90° from the field flux axis to establish an offset angle between the armature winding and a field flux axis wherein movement of the at least one pair of brushes in a first direction from the neutral position varies the speed of the armature in a first rotational direction and movement of the at least one pair of brushes in a second direction from the neutral position varies the speed of the armature in a second rotational direction; and, d) an electrical power source electrically connected to the at least one pair of brushes such that magnetic flux of the field poles is excited by the current passing through the armature winding as the at least one pair of brushes are moved away from the neutral position.

2. The armature winding offset angle excited and speed controlled rectifier type of electric of claim 1 wherein the magnetic inductive material of the non-permanent magnetic field poles comprises a cast steel.

* * * * *